United States Patent
Moriwaki (10) Patent No.: US 7,561,503 B2
(45) Date of Patent: Jul. 14, 2009

(54) CLOCK SIGNAL GENERATING DEVICE AND AN OPTICAL DISC APPARATUS INCORPORATING THE DEVICE

(75) Inventor: Isamu Moriwaki, Osaku-fu (JP)

(73) Assignee: Ricoh Company, Ltd., Tokyo (JP)

( * ) Notice: Subject to any disclaimer, the term of this patent is extended or adjusted under 35 U.S.C. 154(b) by 707 days.

(21) Appl. No.: 11/175,293

(22) Filed: Jul. 7, 2005

(65) Prior Publication Data

US 2006/0007834 A1    Jan. 12, 2006

(30) Foreign Application Priority Data

Jul. 7, 2004    (JP) ............................. 2004-200644

(51) Int. Cl.
    *G11B 7/00*    (2006.01)
(52) U.S. Cl. ............... 369/47.15; 369/59.22; 369/47.35
(58) Field of Classification Search ............. 369/47.27, 369/47.28, 124.01, 124.1, 124.07, 124.13, 369/47.1, 47.18, 44.13, 59.21, 47.26, 47.2, 369/47.19, 47.15, 59.22, 47.35
See application file for complete search history.

(56) References Cited

U.S. PATENT DOCUMENTS

| | | | | |
|---|---|---|---|---|
| 6,104,682 A | * | 8/2000 | Konishi | 369/44.34 |
| 6,785,207 B2 | * | 8/2004 | Nishimura et al. | 369/47.27 |
| 7,327,658 B2 | | 2/2008 | Mouri et al. | |
| 7,349,305 B2 | * | 3/2008 | Lee et al. | 369/47.28 |

FOREIGN PATENT DOCUMENTS

| | | |
|---|---|---|
| JP | 11-86417 | 3/1999 |
| JP | 2003-115174 | 4/2003 |
| JP | 2004-185669 | 7/2004 |

* cited by examiner

*Primary Examiner*—Nabil Z Hindi
(74) *Attorney, Agent, or Firm*—Dickstein Shapiro LLP (57) ABSTRACT

A clock generating circuit includes: a clock data extracting circuit extracting a clock data signal from a wobble signal detected from an optical disc by passing frequencies around a central frequency, which is changed responsive to the frequency of the wobble signal according to a control signal; and a signal generating circuit generating a recording clock signal, from the clock data signal, having a frequency proportional to a frequency of the wobble signal. An optical disc apparatus incorporates the clock generating circuit.

26 Claims, 6 Drawing Sheets

| CENTRAL FREQUENCY (MHz) | a1 | a2 | b0 | b1 | b2 |
|---|---|---|---|---|---|
| 0.82 | -1.989975 | 0.990538 | 0.004731 | 0 | -0.004731 |
| 1.64 | -1.978931 | 0.981170 | 0.009415 | 0 | -0.009415 |
| 2.46 | -1.966889 | 0.971900 | 0.014050 | 0 | -0.014050 |
| 3.28 | -1.953867 | 0.962732 | 0.018634 | 0 | -0.018634 |
| 4.10 | -1.939888 | 0.953670 | 0.023165 | 0 | -0.023165 |
| 4.92 | -1.924971 | 0.944716 | 0.027642 | 0 | -0.027642 |
| 5.74 | -1.909137 | 0.935874 | 0.032063 | 0 | -0.032063 |
| 6.56 | -1.892407 | 0.927147 | 0.036427 | 0 | -0.036427 |
| 7.38 | -1.874801 | 0.918537 | 0.040731 | 0 | -0.040731 |
| 8.20 | -1.856340 | 0.910048 | 0.044976 | 0 | -0.044976 |
| 9.02 | -1.837044 | 0.901682 | 0.049159 | 0 | -0.049159 |
| 9.84 | -1.816933 | 0.893441 | 0.053280 | 0 | -0.053280 |
| 10.66 | -1.796027 | 0.885327 | 0.057336 | 0 | -0.057336 |
| 11.48 | -1.774346 | 0.877343 | 0.061328 | 0 | -0.061328 |
| 12.30 | -1.751910 | 0.869492 | 0.065254 | 0 | -0.065254 |
| 13.12 | -1.728739 | 0.861774 | 0.069113 | 0 | -0.069113 |

| CENTRAL FREQUENCY (MHz) | A1 | A2 | B |
|---|---|---|---|
| 0.82 | 0.010025 | 0.009462 | 0.004731 |
| 1.64 | 0.021069 | 0.018830 | 0.009415 |
| 2.46 | 0.033111 | 0.028100 | 0.014050 |
| 3.28 | 0.046133 | 0.037268 | 0.018634 |
| 4.10 | 0.060112 | 0.046330 | 0.023165 |
| 4.92 | 0.075029 | 0.055284 | 0.027642 |
| 5.74 | 0.090863 | 0.064126 | 0.032063 |
| 6.56 | 0.107593 | 0.072853 | 0.036427 |
| 7.38 | 0.125199 | 0.081463 | 0.040731 |
| 8.20 | 0.143660 | 0.089952 | 0.044976 |
| 9.02 | 0.162956 | 0.098318 | 0.049159 |
| 9.84 | 0.183067 | 0.106559 | 0.053280 |
| 10.66 | 0.203973 | 0.114673 | 0.057336 |
| 11.48 | 0.225654 | 0.122657 | 0.061328 |
| 12.30 | 0.248090 | 0.130508 | 0.065254 |
| 13.12 | 0.271261 | 0.138226 | 0.069113 |

CLOCK SIGNAL GENERATING DEVICE AND AN OPTICAL DISC APPARATUS INCORPORATING THE DEVICE

FIELD OF THE INVENTION

The following disclosure relates generally to a clock signal generating device and an optical disc apparatus incorporating the device.

This patent application is based on and claims priority to Japanese patent application No. 2004-200644 filed on Jul. 7, 2004, in the Japanese Patent Office, the entire contents of which are hereby incorporated by reference.

DESCRIPTION OF THE RELATED ART

In a recordable or rewritable optical disc, pre-format information, such as address data or clock data, is previously recorded in a manufacturing process. For example, the pre-format information may be recorded in a wobbled groove track or a wobbled land track, using the constant linear velocity (CLV) method or the constant angular velocity (CAV) method.

When reading or recording data from or onto the optical disc, an existing optical disc apparatus irradiates a light to a specific spot on the surface of the optical disc, and generates a wobble signal corresponding to the wobbled track of the optical disc. The pre-format information can be extracted from the wobble signal by removing noise components from the wobble signal. Based on the extracted pre-format information, the existing optical disc apparatus can perform a reading or recording operation in a suitable manner.

For example, the existing optical disc apparatus may extract a clock data signal having the clock data from the wobble signal by selecting a frequency corresponding to the clock data signal, and generate a reference clock signal ("recording clock signal") based on the clock data signal for recoding the data. Based on the recording clock signal, the data is recorded on a portion of the optical disc, using the CLV method or CAV method.

In order to extract the clock data signal from the wobble signal, the frequency of the clock data signal needs to be specified with high accuracy. However, the frequency of the wobble signal increases corresponding to a radial position of the irradiated spot on the optical disc, if the CAV method is used for recording. This problem may be more noticeable when the CAV method is applied for recording data onto an optical disc preformatted with the CLV method.

BRIEF SUMMARY OF THE INVENTION

An exemplary embodiment of the present invention includes a clock signal generating device comprising a clock data extracting circuit and a signal generating circuit. The clock data extracting circuit extracts a clock data signal from a wobble signal detected from an optical disc by passing frequencies around a central frequency, which is changed according to the frequency of the wobble signal according to a control signal. The signal generating circuit generates a recording clock signal, from the clock data signal, having a frequency proportional to a frequency of the wobble signal.

Another exemplary embodiment of the present invention includes an optical disc apparatus for recording recorded data onto an optical disc, comprising an optical pickup device and an encoder. The optical pickup device detects a wobble signal from the optical disc. The encoder records the recorded data onto a specific portion of the optical disc using the optical pickup device at a timing determined by a clock signal generating device. The clock signal generating device includes: a clock data extracting circuit extracting a clock data signal from the wobble signal by passing frequencies around a central frequency, which is changed according to the frequency of the wobble signal; and a signal generating circuit generating the recording clock signal, from the clock data signal, having a frequency proportional to a frequency of the wobble signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In describing preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an optical disc apparatus, according to an exemplary embodiment of the present invention.

The optical disc apparatus 1 is capable of reading or recording data from or onto an optical disc 2. The optical disc 2 includes any kind of optical media, such as Compact Disc-Recordable (CD-R), Compact Disc-ReWritable (CD-RW), Digital Versatile Disk-Recordable/+Recordable (DVD-R/+R), Digital Versatile Disk-ReWritable/+ReWritable (DVD-RW/+RW), and Digital Versatile Disk Random Access Memory (DVD-RAM), for example.

Figure 1:
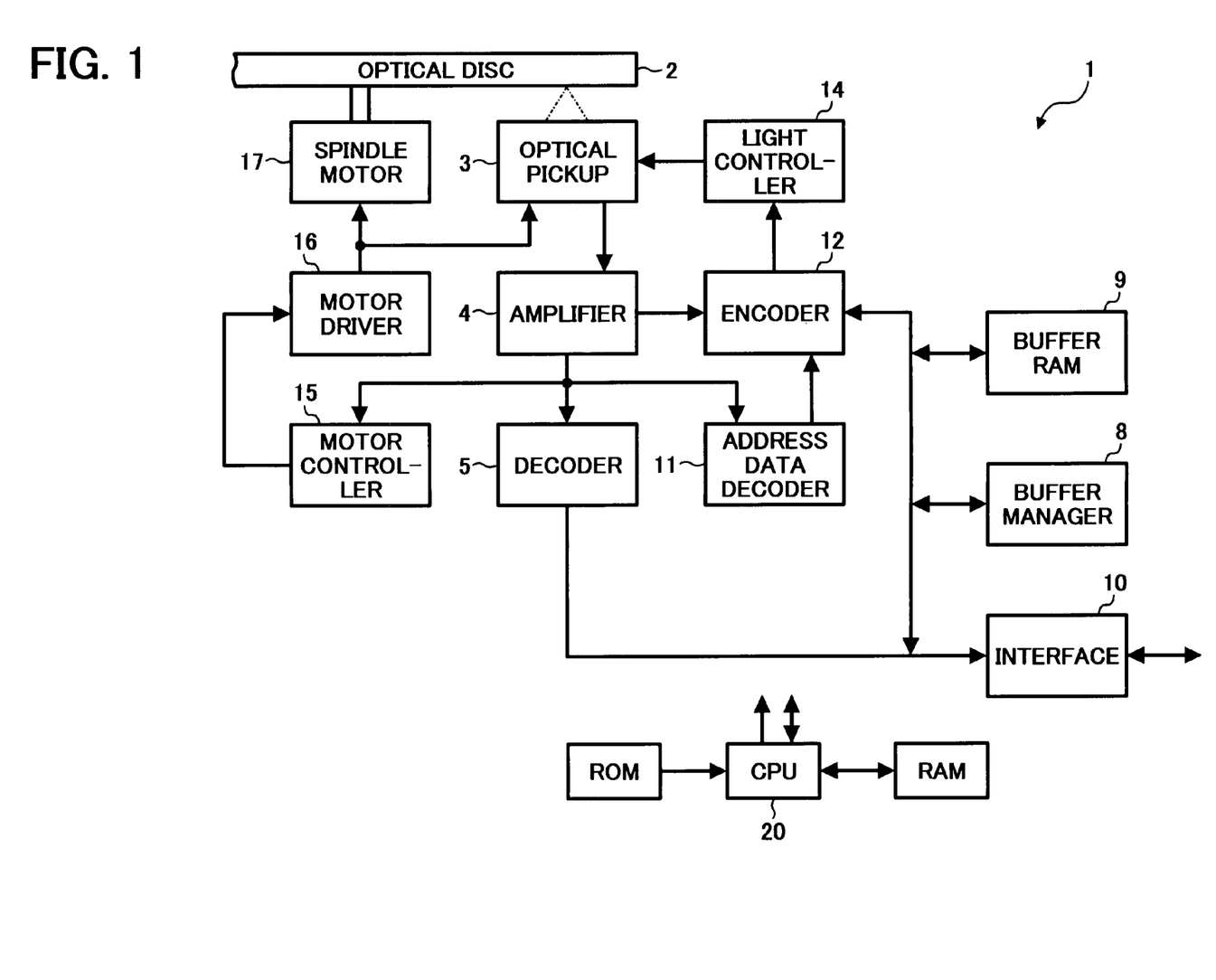
FIG. 1 is a schematic diagram illustrating an optical disc apparatus according to an exemplary embodiment of the present invention.

As shown in FIG. 1, the optical disc apparatus 1 mainly buffer random access memory (RAM) 9, an interface 10, an address data decoder 11, an encoder 12, a light controller 14, a motor controller 15, a motor driver 16, a spindle motor 17, and a central processing unit (CPU) 20.

The spindle motor 17 rotates the optical disc 2 with a predetermined rotation speed.

The motor driver 16 drives the spindle motor 17 according to a rotation control signal generated by the motor controller 15. Further, the motor driver 16 drives the optical pickup 3 according to tracking and focusing control signals generated by the motor controller 15.

The optical pickup 3 includes a semiconductor laser, optical system, focus actuator, track actuator, light receiving element, position sensor, etc. With this structure, the optical pickup 3 reads or records data from or onto the optical disc 2, by irradiating a light onto a spot on the surface of the optical disc 2. Based on a light reflected from the surface of the optical disc 2, one or more electric signals may be generated.

In one example, the optical pickup 3 may generate a tracking error signal and a focusing error signal based on the reflected light. In another example, the optical pickup 3 may generate a radio frequency (RF) signal based on the reflected light. In another example, the optical pickup 3 may generate a wobble signal based on the reflected light. In this exemplary embodiment, the wobble signal refers to an electric signal generated in the optical apparatus 1 corresponding to a wobbled groove track or a wobbled land track formed on the surface of the optical disc 2.

The amplifier 4 amplifies the electric signals generated by the optical pickup 3. Specifically, the amplifier 4 amplifiers the wobble signal and sends the signal to the address data decoder 11 and the encoder 12. The amplifier 4 also amplifies the tracking and focusing error signals, and sends the signals to the motor controller 15. In addition, the amplifier 4 amplifies the RF signal and sends the signal to the decoder 5.

The motor controller 15 generates the tracking and focusing control signals based on the tracking and focusing error signals. Further, the motor controller 15 generates the rotation control signal, which indicates a rotation speed of the spindle motor 17. The rotation speed may be determined by the CPU 20, for example. The motor controller 15 may be implemented by a servo circuit, for example.

The decoder 5 extracts data ("reproduced data") to be reproduced by the optical apparatus 1 from the RF signal. The decoder 5 further digitalizes and decodes the reproduced data. The reproduced data is then stored in the buffer RAM 9 via the buffer manager 8. At this time, the decoder 5 may check the reproduced data for any error. The reproduced data, stored in the buffer RAM 9, may be transferred to a host computer (not shown) via the interface 10. The interface 10 may be in compliance with any one of the standards including the ATAPI (AT Attachment Packet Interface), ATA (AT Attachment), SCSI (Small Computer System Interface), USB (Universal Serial Bus), etc.

The buffer RAM 9 is capable of storing various data. For example, the buffer RAM 9 may store data that has been read out from the optical disc 2, i.e., the reproduced data. In another example, the buffer RAM 9 may store data ("recorded data") to be recorded onto the optical disc 2. In this exemplary embodiment, the recorded data is stored by the host computer connected to the optical apparatus 1 via the interface 10.

The buffer manager 8 manages the amount of data stored in the buffer RAM 9, by controlling data input to or output from the buffer RAM 9. For example, when the amount of data in the buffer RAM 9 reaches a predetermined level, the buffer manager 8 notifies the CPU 20 that no more data can be stored in the buffer RAM 9.

The address data decoder 11 extracts information ("address data") necessary for locating a radial position of an irradiated spot of the optical disc 2, from the wobble signal. The address data decoder 11 further digitalizes and decodes the address data. The address data may be output to the encoder 12. Alternatively, the address data may be output to the CPU 20. In this exemplary embodiment, if the optical disc 2 is a CD-R/RW, ATIP (absolute time in pregroove) data is obtained as the address data. If the optical disc 2 is a DVD-R/RW, LLP data is obtained as the address data. If the optical disc 2 is a DVD+R/RW, ADIP (address in pregroove) is obtained as the address data. The address data may be expressed in the form of signal.

The encoder 12 reads out the recorded data from the buffer RAM 9 via the buffer manager 8, and encodes the recorded data. Further, the encoder 12 extracts information ("clock data") necessary for generating a clock data signal, from the wobble signal. The encoder 12 then generates a recording clock signal from the clock data signal. The encoder 12 may further adjust the recording clock signal using the address data.

The light controller 14 controls the amount of a light emitted from the optical pickup 3.

The CPU 20, which may be provided with a memory such as a ROM and a RAM, controls an entire operation of the optical disc apparatus 1.

Figure 2:
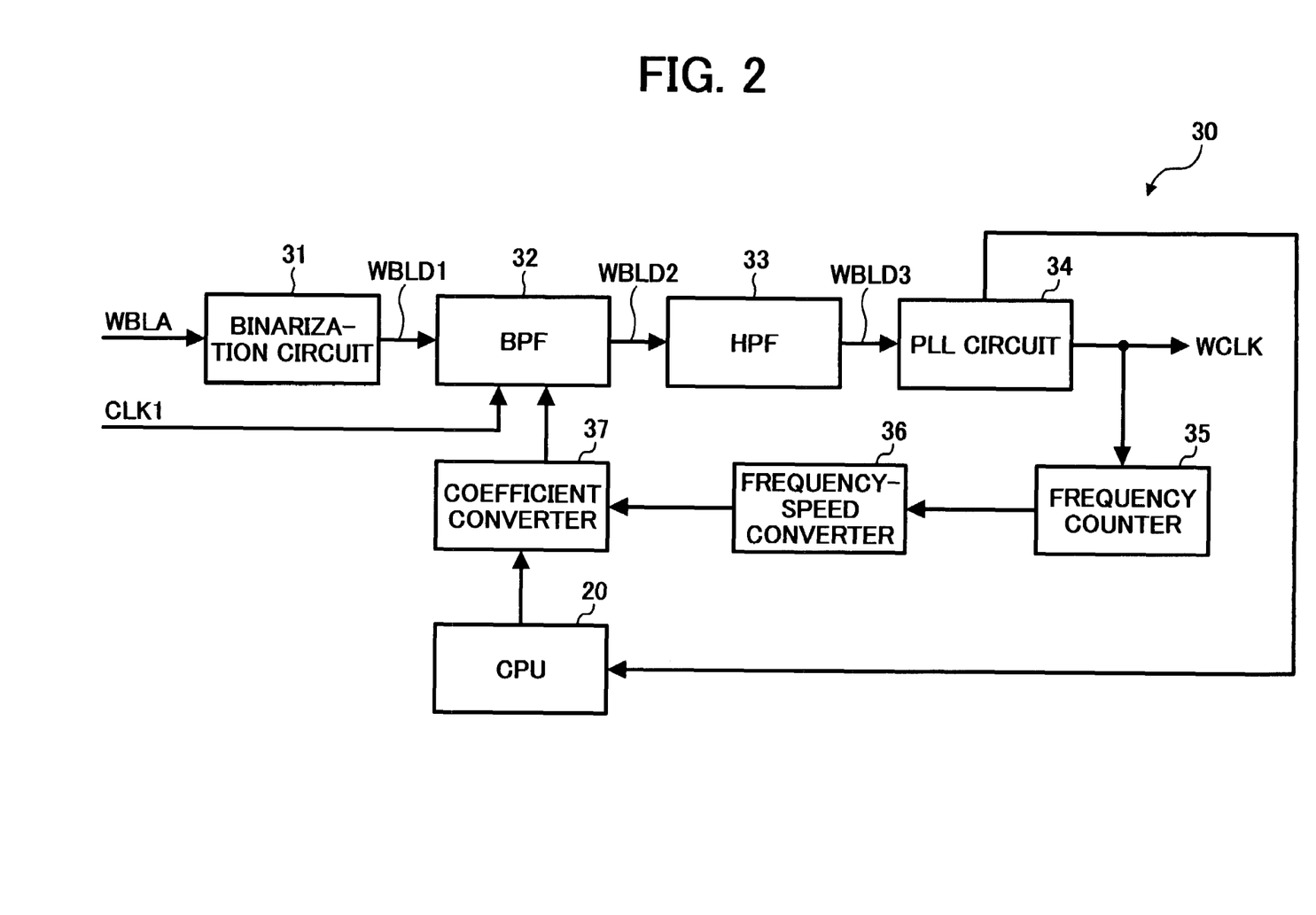
FIG. 2 is a schematic circuit diagram illustrating a clock signal generating device according to an exemplary embodiment of the present invention.

Referring now to FIG. 2, a structure of a clock signal generating device 30 is explained according to an exemplary embodiment of the present invention. The clock signal generating device 30 is incorporated in the encoder 12 for generating a recording clock signal based on a wobble signal detected from the optical disc 2.

As shown in FIG. 2, the clock signal generating circuit 30 includes a binarization circuit 31, a bandpass filter (BPF) 32, a high pass filter (HPF) 33, a phase-locked loop (PLL) circuit 34, a coefficient converter 37, a frequency-speed converter 36, and a frequency counter 35.

The binarization circuit 31 binarizes a wobble signal WBLA input by the amplifier 4 (FIG. 1), and outputs a binary wobble signal WBLD1 to the BPF 32. The binarization circuit 31 may be implemented by a comparator, for example, however, it may be substituted by an analog/digital converter capable of digitalizing the wobble signal WBLA. Further, the binarization circuit 31 is preferably a digital circuit.

The BPF 32 removes noise components from the wobble signal WBLD1 by passing a predetermined range of frequencies around a central frequency, and outputs a clock data signal WBLD2 to the HPF 33. The BPF 32 may be implemented by any kind of digital or analog filter, preferably a digital filter such as a second-order Infinite Impulse Response (IIR) filter, for example.

Further, as shown in FIG. 2, the BPF 32 receives a sampling clock signal CLK1, which is generated by an oscillator (not shown). The oscillator includes a crystal oscillator or a PLL circuit including a crystal oscillator, for example. The BPF 32 generates the clock data signal WBLD2 in synchronization with the sampling clock signal CLK1.

The HPF 33 removes a direct current (DC) component from the clock data signal WBLD2, and outputs a filtered signal WBLD3 to the PLL circuit 34. The HPF 33 may be implemented by any kind of digital or analog filter, preferably a digital filter such as a first-order IIR, for example.

The PLL circuit 34 generates a clock signal having a frequency determined by a frequency of the filtered signal WBLD3, and outputs it as a recording clock signal WCLK. In this exemplary embodiment, since the frequencies of the signals WBLD1, WBLD2, and WBLD3 remain substantially constant, the recording clock signal WCLK has a frequency proportional to the frequency of the wobble signal WBLA. The PLL circuit 34 may be implemented by any kind of analog or digital filter, preferably a digital filter. If the analog filter is used, a low pass filter (LPF) may be preferably added between the HPF 33 and the PLL circuit 34.

The frequency counter 35 detects the frequency of the recording clock signal WCLK.

The frequency-speed converter 36 selects a recording speed corresponding to the detected frequency.

The coefficient converter 37 controls the filter characteristics of the BPF 32 based on the selected recording speed. Since the selected recording speed is determined based on the frequency of the recording clock signal WCLK, which is proportional to the frequency of the wobble signal WBLA, the filter characteristics of the BPF 32 can be determined based on the frequency of the wobble signal WBLA. Specifically, the coefficient converter 37 changes the central frequency of the BPF 32 according to the frequency of the wobble signal WBLA.

For example, if the optical apparatus 1 records data on the optical disc 2 using the CAV method, the frequency of the wobble signal WBLA increases proportionally, as a radial position of the irradiated spot moves from an inner radial disc position to and outer radial disc position during the recording operation. Accordingly, the central frequency of the BPF 32 increases according to the increased frequency of the wobble signal WBLA, and the clock data signal WBLD2 can be extracted with high accuracy.

In another example, if the optical apparatus 1 records data on the optical disc 2 using the CLV method, the frequency of the wobble signal WBLA remains relatively constant during the recording operation. Accordingly, the central frequency of the BPF 32 remains relatively constant, and the clock data signal WBLD2 can be extracted with high accuracy.

By changing the central frequency of the BPF 32 according to the frequency of the wobble signal WBLA, the recording clock signal WCLK may be generated with high accuracy in a relatively short time period after a recording operation is started. Thus, any problems attributable to clock inaccuracies, such as jitter, may be suppressed.

Figure 3:
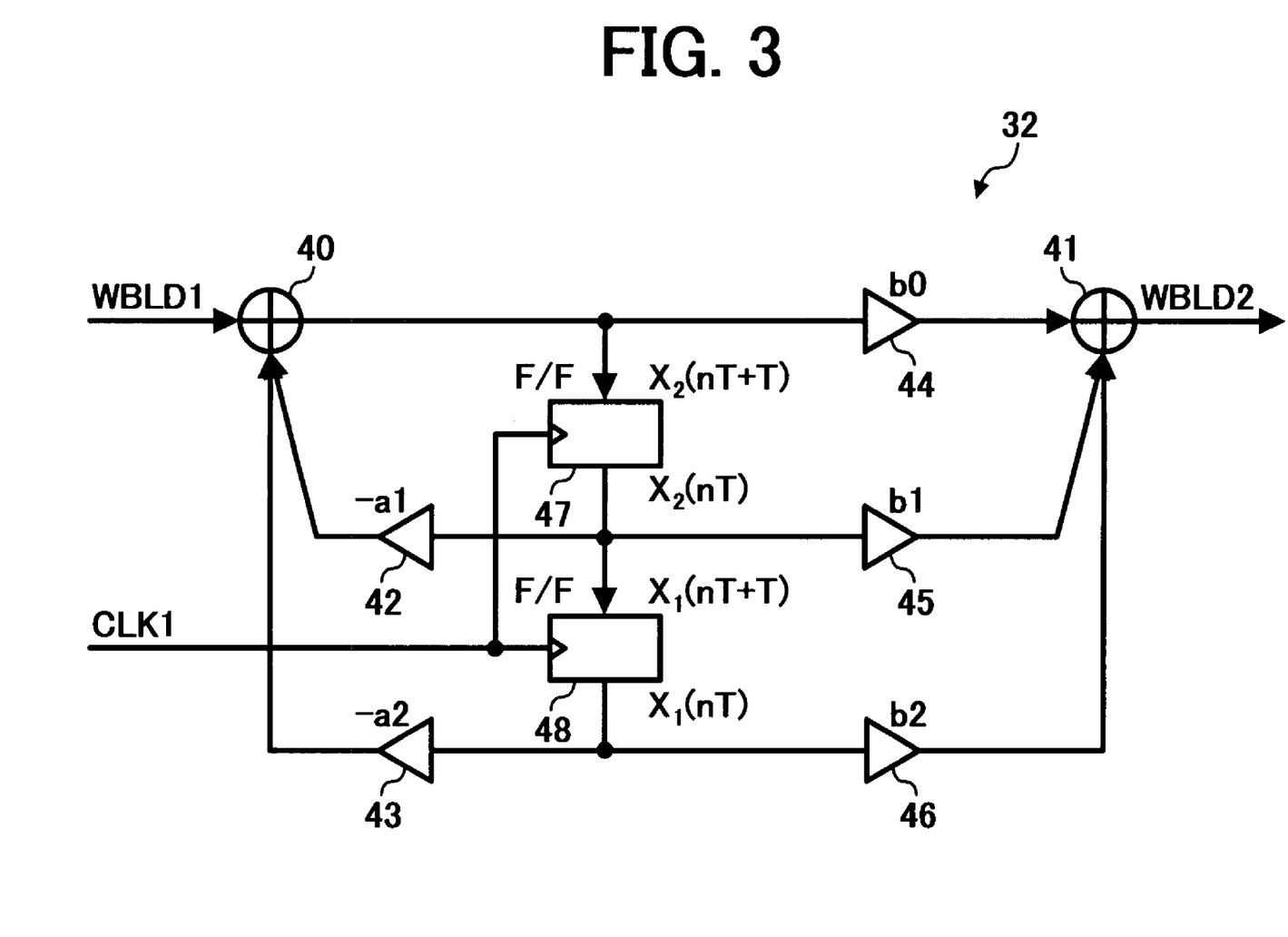
FIG. 3 is a schematic circuit diagram illustrating a band-pass filter shown in FIG. 2, according to an exemplary embodiment of the present invention.

Referring now to FIG. 3, a structure of the BPF 32 is explained according to an exemplary embodiment of the present invention.

The BPF 32 of FIG. 3 is a second-order IIR filter, and includes a first adder 40, second adder 41, first multiplier 42, second multiplier 45, third multiplier 43, fourth multiplier 46, fifth multiplier 44, first delay element 47, and second delay element 48.

In this exemplary embodiment, any one of the delay elements 47 and 48 may be implemented by flip flop. The sampling clock signal CLK1 is input to the first and second delay elements 47 and 48, respectively. In this exemplary embodiment, delay is determined based on a sampling period of the sampling clock signal CLK1.

In operation, the first adder 40 inputs the wobble signal WBLD1 to the first delay element 47. The first delay element 47 waits for one sampling period, and outputs a first output signal to the first multiplier 42, the second delay element 48, and the second multiplier 45, respectively. The first multiplier 42 multiplies the first output signal by a coefficient −a1, and outputs a second output signal to the first adder 40. The second multiplier 45 multiplies the first output signal by a coefficient b1, and outputs a third output signal to the second adder 41.

The second delay element 48, which receives the first output signal, waits for one sampling period, and outputs a fourth output signal to the third multiplier 43 and the fourth multiplier 46, respectively. The third multiplier 43 multiplies the fourth output signal by a coefficient −a2, and outputs a fifth output signal to the first adder 40. The fourth multiplier 46 multiplies the fourth output signal by a coefficient b2, and outputs a sixth output signal to the second adder 41.

The first adder 40 adds the second output signal and the fifth output signal, and outputs a seventh output signal to the fifth multiplier 44. In this exemplary embodiment, the second output signal is output from the first multiplier 42 at a timing delayed by one sampling period than the timing when the wobble signal WBLD1 is input. The fifth output signal is output from the third multiplier 43 at a timing delayed by two sampling periods than the timing when the wobble signal WBLD1 is input. The fifth multiplier 44 multiplies the seventh output signal with a coefficient b0, and output an eighth output signal to the second adder 41.

The second adder 41 adds the third output signal, the sixth output signal, and the eighth output signal, to generate the clock data signal WBLD2. In this exemplary embodiment, the third output signal is output from the second multiplier 45 at a timing delayed by one sampling period than the timing when the wobble signal WBLD1 is input. The sixth output signal is output from the fourth multiplier 46 at a timing delayed by two sampling periods than the timing when the wobble signal WBLD1 is input.

With the structure of FIG. 3, the frequency of the BPF 32, i.e., the frequency of the clock data signal WBLD2, may be calculated with the following transfer function:

$$H(z) = \frac{\left(b0 + \frac{b1}{z} + \frac{b2}{z^2}\right)}{\left(1 + \frac{a1}{z} + \frac{a2}{z^2}\right)}$$

$$H(z) = (b0 + b1*Z^{-1} + b2*Z^{-2})/(1 + a1*Z^{-1} + a2*Z^{-2}).$$

In this exemplary embodiment, any one of the coefficients a1, a2, b0, b1, and b2 may be determined by the coefficient converter 37.

In a first mode, the coefficient converter 37 determines any one of the coefficients, according to the recording clock signal detected by the frequency counter 35. In a second mode, the coefficient converter 37 determines any one of the coefficients, according to an instruction of the CPU 20, when the recording clock signal WCLK is not detected, for example.

Referring back to FIG. 2, an operation of determining coefficients corresponding to a central frequency of the BPF32 using the first mode is explained according to an exemplary embodiment of the present invention.

The frequency counter 35 counts a number of edges detected in the recording clock signal WCLK for a predetermined unit time, and outputs the counted value to the frequency-speed converter 36. In this exemplary embodiment, the frequency of the recording clock signal WCLK is made proportional to the frequency of the wobble signal WBLA. Accordingly, the counted value is proportional to the frequency of the wobble signal WBLA.

The frequency-speed converter 36 is provided with one or more conversion tables, each corresponding to a type of optical media or a type of preformat, for example. The conversion table stores a counted value range and a recording speed of the optical disc 2 in a corresponding manner. Using the conversion table, the frequency-speed converter 36 selects a recording speed suitable for the counted value obtained by the frequency counter 35, and outputs the selected recording speed to the coefficient converter 37.

For example, the frequency-speed converter 36 may be provided with a conversion table for DVD+R/RW, which stores a specific counted value range for each of 1× to 16× recording speeds. If a detected counted value belongs to a first counted value range, the recording speed corresponding to the first counted value range is selected. However, the counted value increases during a recording operation, as the radial position of the irradiated spot on the optical disc 2 moves from the inner radial disc position to the outer radial disc position. If a detected counted value exceeds the first counted value range, a second counted value range may be selected, which includes the detected counted value. The recording speed corresponding to the second counted value range is then selected.

The coefficient converter 37 is provided with one or more coefficient tables, each corresponding to a type of recording media, a type of preformat, or the characteristics of the BPF 32 such as the passband, for example. The coefficient table stores a plurality of central frequency values of the BPF 32, and a set of coefficients used in the transfer function, in a corresponding manner with a recording speed of the optical disc 2. Using the coefficient table, the coefficient converter 37 selects a set of coefficients suitable for the recording speed obtained by the frequency-speed converter 36. Using the selected coefficients, the BPF 32 generates the clock data signal WBLD2, as described above referring to FIG. 3.

Figure 4:
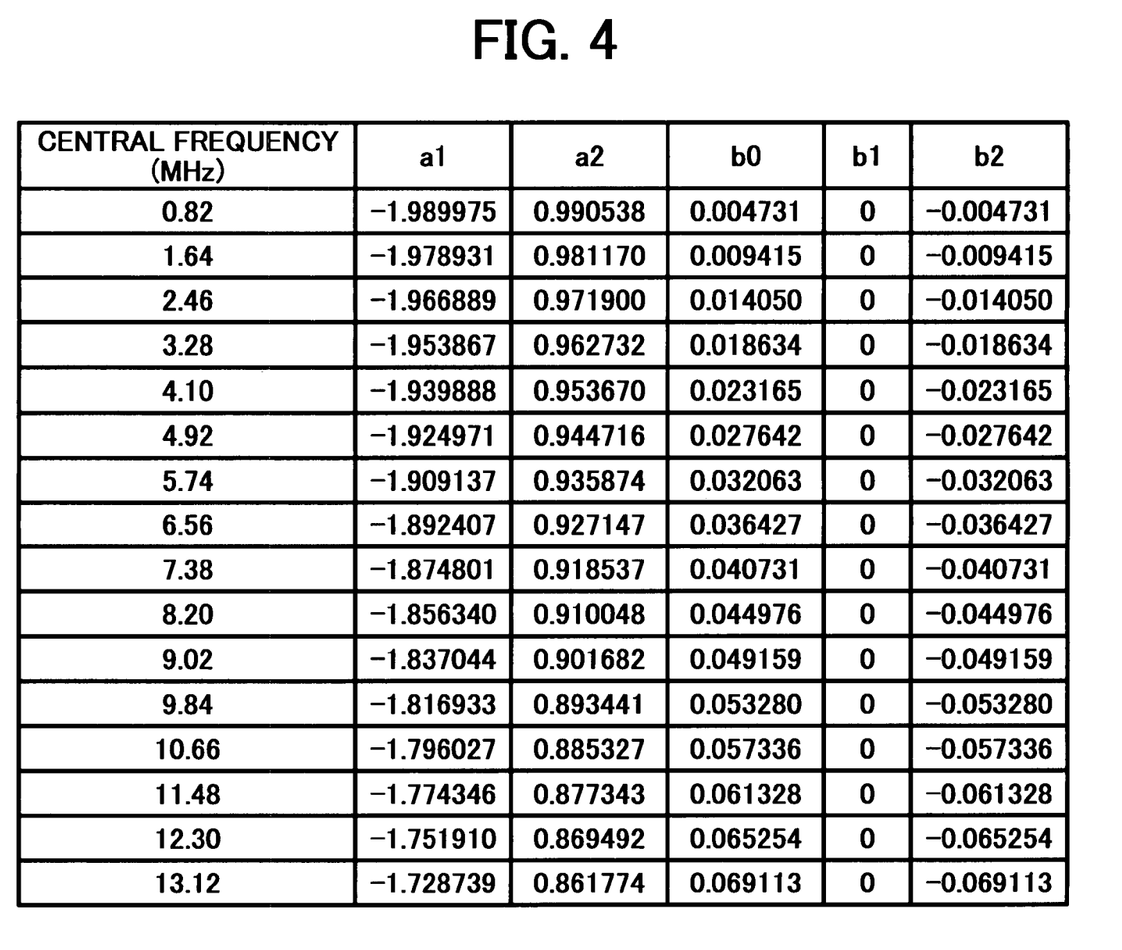
FIG. 4 is an exemplary coefficient table, according to an exemplary embodiment of the present invention.

For example, the coefficient converter 37 may store a coefficient table 4 shown in FIG. 4, which may be preferably used for a DVD+R/RW preformatted with the CLV method, where the frequency of the sampling clock CLK1 is 216 MHz and the passband Q relative to the central frequency is 2.5. For each of the recording speeds 1× to 16×, a set of coefficients is stored, indicating a central frequency of the BPF 32.

In this exemplary embodiment, any one of the conversion tables of the frequency-speed converter 36 and the coefficient tables of the coefficient converter 37 may be stored in any kind of storage device or medium, such as a RAM, for example. Alternatively, any one of the conversion tables and the coefficient tables may be downloaded from a network via the interface 10, for example.

Further, a number of recording speed levels is not limited to 16. For example, data corresponding to 4× to 64× recording speeds may be stored in the conversion table or the coefficient table, for a CD-R/RW.

Furthermore, any number of sets of coefficients corresponding to one recording speed level may be stored. Preferably, the number of sets of coefficients may be defined so as to reduce an error in determining a central frequency of the BPF 32. By increasing the number of sets of coefficients, the error may be reduced within 5%, for example.

Referring back to FIG. 2, an operation of determining a central frequency, i.e., coefficients, of the BPF 32 using the second mode is explained according to an exemplary embodiment of the present invention.

The CPU 20 receives command data from the host computer via the interface 10, requesting recording of recorded data on a portion of the optical disc 2. The CPU 20 extracts address data indicating the portion for recording from the command data. Using the address data, the CPU 20 obtains a radial position on the optical disc 2 corresponding to the address data, and a rotation speed of the spindle motor 17 corresponding to the obtained radial position, respectively. The CPU 20 calculates a frequency of the wobble signal using the rotation speed and the radial position, and selects a recording speed based on the calculated frequency of the wobble signal. The coefficient converter 37 selects a set of coefficients corresponding to the selected recording speed, in a substantially similar manner as described referring to the first mode. In this exemplary embodiment, instead of having the coefficient converter 37 select a set of coefficients, the CPU 20 may select a set of coefficients based on the selected recording speed, and provide it to the BPF 32.

In this exemplary embodiment, the first mode and the second mode may be switched according to an instruction from the CPU 20 or a detection result of the recording clock signal. Further, the first mode and the second mode may be switched by a selector, such as a multiplexer, for example.

In addition to the structure shown in FIG. 2, the clock signal generating device 30 may be implemented in any other ways within the scope of this disclosure and appended claims.

In one example, the functions or operations of the frequency converter 35, frequency-speed converter 36, and coefficient converter 37 may be performed by the CPU 20 or any other processor, as long as the frequency of the wobble signal can be obtained from the frequency of the recording clock signal.

In another example, in addition to the structure shown in FIG. 3, the BPF 32 may be implemented in various ways as long as it is capable of changing its central frequency corresponding to a frequency of a wobble signal.

For example, more than one BPF 32 may be serially connected, each having the passband Q of 2.5.

Figure 5:
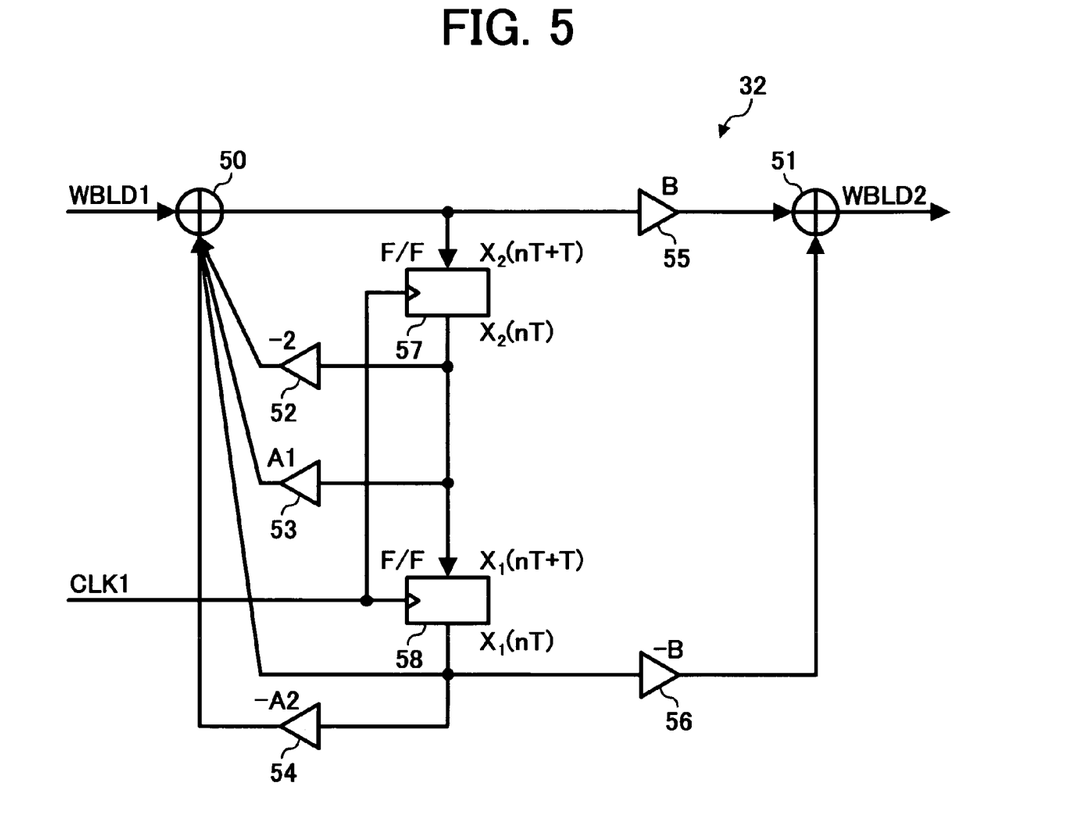
FIG. 5 is a schematic circuit diagram illustrating a band-pass filter shown in FIG. 2, according to an exemplary embodiment of the present invention.

Referring now to FIG. 5, a structure of the BPF 32 is explained according to an exemplary embodiment of the present invention.

The BPF 32 of FIG. 5 is a second-order IIR filter, and includes a first adder 50, second adder 51, first multiplier 52, second multiplier 53, third multiplier 54, fourth multiplier 56, fifth multiplier 55, first delay element 57, and second delay element 58. 7 and 58 may be implemented by flip flop. The sampling clock signal CLK1 is input to the first and second delay elements 57 and 58, respectively. In this exemplary embodiment, delay is determined based on a sampling period of the sampling clock signal CLK1.

In operation, the first adder 50 inputs the wobble signal WBLD1 to the first delay element 57. The first delay element 57 waits for one sampling period, and outputs a first output signal to the first multiplier 52, the second delay element 58, and the second multiplier 53, respectively. The first multiplier 52 multiplies the first output signal by a constant coefficient −2, and outputs a second output signal to the first adder 50. The second multiplier 53 multiplies the first output signal by a coefficient A1, and outputs a third output signal to the first adder 50.

The second delay element 58, receives the first output signal, waits for one sampling period and outputs a fourth output signal to the first adder 50, the third multiplier 54 and the fourth multiplier 56, respectively. The third multiplier 54 multiplies the fourth output signal by a coefficient A2, and outputs a fifth output signal to the first adder 50. The fourth multiplier 56 multiplies the fourth output signal by a coefficient −B, and outputs a sixth output signal to the second adder 51.

The first adder 50 adds the second output signal, the third output signal, the second output signal, and the fifth output signal, and outputs a seventh output signal to the fifth multiplier 55. In this exemplary embodiment, the second output signal and the third output signal are output from the first multiplier 52 and the second multiplier 53, respectively, at a timing delayed by one sampling period than a timing when the wobble signal WBLD1 is input. The second output signal and the fifth output signal are output from the second delay element 58 and the third multiplier 54, respectively, at a timing delayed by two sampling periods than a timing when the wobble signal WBLD1 is input. The fifth multiplier 55 multiplies the seventh output signal with a coefficient B, and output an eighth output signal to the second adder 51.

The second adder 55 adds the eighth output signal and the sixth output signal to generate the clock data signal WBLD2.

In this exemplary embodiment, the sixth output signal is output from the fourth multiplier 56 at a timing delayed by one sampling period than a timing when the wobble signal WBLD1 is input.

Figure 6:
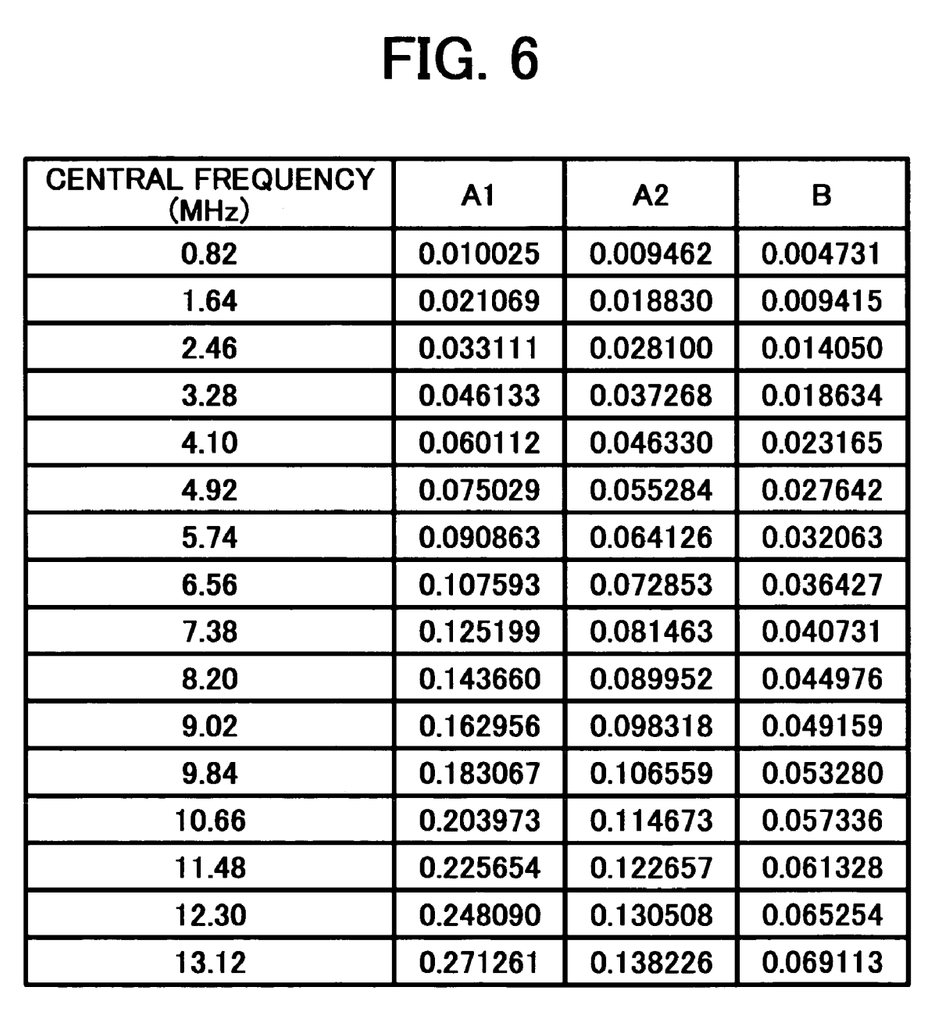
FIG. 6 is an exemplary coefficient table, according to an exemplary embodiment of the present invention.

In this exemplary embodiment, any one of the coefficients A1, A2, and B may be determined by the coefficient converter 37, in a substantially similar manner as described above referring to FIG. 2. However, the coefficient tables of the coefficient converter 37 each store data for a set of coefficients A1, A2, and B, as illustrated in FIG. 6, for example. The coefficient table of FIG. 6 is preferably used for a DVD+R/RW preformatted with the CLV method, where the frequency of the sampling clock CLK1 is 216 MHz and the passband Q relative to the central frequency is 2.5.

Further, in this exemplary embodiment, the coefficients A1, A2, and B used in the BPF 32 of FIG. 5 may be defined so as to correspond to the coefficients used in the BPF 32 of FIG. 3, as expressed in the following equations:

$$a1 = -2 + A1$$

$$a2 = 1 - A2$$

$$b0 = -b2 = B$$

Furthermore, the first multiplier 52 of FIG. 5 may be substituted by combining a shifter and inverter, for example.

Numerous additional modifications and variations are possible in light of the above teachings. It is therefore to be understood that within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims.

Further, any one of the above-described and other functions of the present invention may be embodied in the form of a computer program, stored in any kind of storage medium. Examples of storage medium include, but not limited to, flexible disk, hard disk, optical discs, magneto-optical discs, magnetic tapes, nonvolatile memory cards, ROM (read-only-memory), etc.

The invention claimed is:

1. A clock signal generating device, comprising:
a clock data extracting circuit configured to extract a clock data signal from a wobble signal detected from an optical disc by passing frequencies around a central frequency, the clock data extracting circuit including a computing circuit configured to calculate the central frequency using at least one coefficient; and
a signal generating circuit configured to generate a recording clock signal from the clock data signal, the recording clock signal having a frequency proportional to a frequency of the wobble signal,
wherein the central frequency is adjusted by the clock data extracting circuit, responsive to a control signal, to correspond to the frequency of the wobble signal.

2. The device of claim 1, wherein the clock data extracting circuit includes a digital circuit.

3. The device of claim 2, wherein the signal generating circuit includes a digital circuit.

4. The device of claim 2, further comprising:
a signal converting circuit configured to convert the wobble signal from analog to digital and provide the converted wobble signal to the clock data extractor.

5. The device of claim 4, wherein the signal converting circuit includes a digital circuit.

6. The device of claim 1, further comprising:
a frequency detecting circuit configured to detect the frequency of the recording clock signal,
wherein the frequency of the wobble signal is obtained by the clock data extracting circuit responsive to the frequency of the recording clock signal.

7. The device of claim 1, wherein the at least one coefficient has a value determined by the control signal.

8. The device of claim 1, further comprising:
one or more coefficient tables, each table storing a plurality of coefficient values in a corresponding manner with a plurality of values of the central frequency.

9. The device of claim 8, wherein the at least one coefficient has a value selected from the coefficient tables according to the control signal.

10. The device of claim 8, wherein the clock signal generating device selects one of the coefficients tables according to a recording condition of the optical disc.

11. The device of claim 8, wherein the clock signal generating device selects one of the coefficient tables according to characteristics of the clock data extracting circuit.

12. A clock signal generating device, comprising:
means for extracting a clock data signal from a wobble signal detected from an optical disc by passing frequencies around a central frequency, the means for extracting a clock data signal including means for calculating the central frequency using at least one coefficient;
means for generating a recording clock signal from the clock data signal, the recording clock having a frequency proportional to a frequency of the clock data signal; and
means for changing the central frequency responsive to a frequency of the wobble signal in synchronization with a sampling clock signal.

13. The device of claim 12, wherein the extracting means comprises a digital circuit.

14. The device of claim 13, wherein the generating means comprises a digital circuit.

15. The device of claim 13, further comprising:
means for converting the wobble signal from analog to digital,
wherein the converted wobble signal is provided to the extracting means.

16. The device of claim 15, wherein the converting means comprises a digital circuit.

17. The device of claim 12, wherein the changing means comprises:
means for detecting the frequency of the recording clock signal; and
means for calculating the frequency of the wobble signal using the detected frequency.

18. A clock signal generating device, comprising:
means for extracting a clock data signal from a wobble signal detected from an optical disc by passing frequencies around a central frequency;
means for generating a recording clock signal from the clock data signal, the recording clock having a frequency proportional to a frequency of the clock data signal; and
means for changing the central frequency corresponding to a frequency of the wobble signal in synchronization with a sampling clock signal,
wherein the changing means comprises:
means for detecting the frequency of the recording clock signal;
means for obtaining address data indicating a specific portion of the optical disc;

means for selecting at least one of the detected frequency and the obtained address to generate a selection result; and means for calculating the frequency of the wobble signal according to the selecting result.

19. The device of claim 12, wherein the at least one coefficient is configured to have a value determined by the changing means.

20. The device of claim 19, wherein the changing means comprises:

means for storing a plurality of coefficient values; and means for selecting the value of the at least one coefficient from the plurality of coefficient values according to the frequency of the wobble signal.

21. An optical disc apparatus for recording data to be recorded on an optical disc, comprising:

means for detecting a wobble signal from the optical disc;

means for extracting a clock data signal from the wobble signal by passing frequencies around a central frequency, the means for extracting a clock data signal including means for calculating the central frequency using at least one coefficient;

means for generating a recording clock signal from the clock data signal, the recording clock signal having a frequency proportional to a frequency of the wobble signal;

means for changing the central frequency responsive to a frequency of the wobble signal in synchronization with a sampling clock signal; and means for recording the data to be recorded onto a specific portion of the optical disc at a timing determined by the recording clock signal.

22. An optical disc apparatus for recording data to be recorded onto an optical disc, comprising:

an optical pickup device configured to detect a wobble signal from the optical disc; and an encoder configured to record the data to be recorded onto a specific portion of the optical disc using the optical pickup device at a timing determined by a clock signal generating device, the clock signal generating device comprising:

a clock data extracting circuit configured to extract a clock data signal from the wobble signal by passing frequencies around a central frequency, which is changed responsive to the frequency of the wobble signal, the clock data extracting circuit including a computing circuit configured to calculate the central frequency using at least one coefficient; and a signal generating circuit configured to generate the recording clock signal from the clock data signal, the recording clock signal having the frequency proportional to a frequency of the wobble signal.

23. The device of claim 1, wherein the computing circuit is further configured to:

obtain a radial position on the optical disc corresponding to a specific portion onto which data is to be recorded and a rotation speed of the optical disc that corresponds to the radial position;

calculate the frequency of the wobble signal using the radial position and the rotation speed; and select the at least one coefficient that causes the calculated central frequency to have a value corresponding to the calculated frequency of the wobble signal.

24. The device of claim 23, wherein the control signal is generated based on a detection result of the recording clock signal generated by the signal generating circuit.

25. The apparatus of claim 22, wherein the computing circuit is further configured to:

obtain a radial position on the optical disc corresponding to the specific portion onto which the data to be recorded is recorded and a rotation speed of the optical disc that corresponds to the radial position, and to calculate the frequency of the wobble signal using the radial position and the rotation speed, and select the at least one coefficient that causes the calculated central frequency to have a value corresponding to the calculated frequency of the wobble signal.

26. The apparatus of claim 25, wherein the computing circuit is further configured to select at least one coefficient based on a control signal, the control signal being generated based on a detection result of the recording clock signal generated by the signal generating circuit.

* * * * *